(12) United States Patent
Das

(10) Patent No.: US 9,173,157 B2
(45) Date of Patent: Oct. 27, 2015

(54) WIRELESS STATION CLUSTERING IN COOPERATIVE COMMUNICATIONS

(75) Inventor: Sushanta Das, Pleasantville, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1248 days.

(21) Appl. No.: 12/517,820

(22) PCT Filed: Dec. 19, 2007

(86) PCT No.: PCT/IB2007/055229
§ 371 (c)(1),
(2), (4) Date: Jun. 5, 2009

(87) PCT Pub. No.: WO2008/081381
PCT Pub. Date: Jul. 10, 2008

(65) Prior Publication Data
US 2010/0309842 A1    Dec. 9, 2010

Related U.S. Application Data

(60) Provisional application No. 60/871,998, filed on Dec. 27, 2006.

(51) Int. Cl.
*H04W 4/00* (2009.01)
*H04W 40/32* (2009.01)
*H04L 12/715* (2013.01)
*H04W 40/24* (2009.01)

(52) U.S. Cl.
CPC ............. *H04W 40/32* (2013.01); *H04L 45/46* (2013.01); *H04W 40/24* (2013.01)

(58) Field of Classification Search
CPC ....... H04L 45/46; H04W 40/32; H04W 40/24
USPC ............... 370/328; 455/422.1–460, 524–525
See application file for complete search history.

(56) References Cited

U.S. PATENT DOCUMENTS 5,790,516 A * 8/1998 Gudmundson et al. ........ 370/210
6,711,409 B1 * 3/2004 Zavgren et al. ............... 455/445
(Continued)

FOREIGN PATENT DOCUMENTS

WO    WO03084160 A1    10/2003
WO    WO 03084160 A1 * 10/2003
(Continued)

OTHER PUBLICATIONS

Nortel, White Paper: "Considerations for Deploying Mobile WiMAX at various Frequencies", year 2006.
(Continued)

*Primary Examiner* — Mang Yeung
(74) *Attorney, Agent, or Firm* — Larry Liberchuk

(57) ABSTRACT

A method and a wireless system. The system including a cluster of wireless stations (STAs), an access point (AP), and at least one cluster lead configured to send and receive data from the STAs and the AP and to retransmit the received data to other cluster leads, or to the AP, or both. The at least one cluster lead includes an STA designated by the AP from the cluster of STAs based at least partially on channel coherence time.

18 Claims, 2 Drawing Sheets

(56) References Cited

U.S. PATENT DOCUMENTS

| | | | |
|---|---|---|---|
| 2002/0169846 A1* | 11/2002 | Chen et al. | 709/209 |
| 2003/0041150 A1* | 2/2003 | Passman et al. | 709/227 |
| 2004/0082296 A1* | 4/2004 | Twitchell, Jr. | 455/41.2 |
| 2004/0114560 A1* | 6/2004 | Jacobsen | 370/338 |
| 2006/0120477 A1 | 6/2006 | Shen | |
| 2008/0014884 A1* | 1/2008 | Oyman et al. | 455/187.1 |

FOREIGN PATENT DOCUMENTS

| | | |
|---|---|---|
| WO | WO2004100480 A1 | 11/2004 |
| WO | WO2006047202 A2 | 5/2006 |
| WO | WO2006083535 A2 | 8/2006 |

OTHER PUBLICATIONS

J. Nicholas Lanemna et al., "Distributed Space-Time Coded Protocols for Exploiting Cooperative Diversity in Wireless Networks", IEEE Trans. Inform. Theory, vol. XXX, No. XXX, Oct. 2003.

J. Nicholas Lanemna et al., "Cooperative Diversity in Wireless Networks: Efficient Protocols and Outage Behavior", IEEE Trans Inform Theory, Dec. 2004.

Deqiang Chen et al., "Cooperative Diversity for Wireless Fading Channels without Channel State Information", Nov. 7-10, 2004.

Hassan Yaghoobi, "Scalable OFDMA Physical Layer in IEEE 802.16 WirelessMAN", Intel Technology Journal, vol. 8, Issue 3, Aug. 20, 2004, ISSN 1535-864X http://developer.intel.com/technology/itj/index.htm.

\* cited by examiner

WIRELESS STATION CLUSTERING IN COOPERATIVE COMMUNICATIONS

Wireless communication technology has significantly advanced making the wireless medium a viable alternative to wired solutions. As such, the use of wireless connectivity in data and voice communications continues to increase. These devices include mobile telephones, portable computers in wireless networks (e.g., wireless local area networks (WLANs), stationary computers in wireless networks, portable handsets, to name only a few).

In addition to becoming more prevalent in everyday use, wireless devices are increasingly relied upon to provide reliable service at higher data rates. One way to increase the bandwidth capability of a wireless device, or to improve the reliability of the device, or both, is through the use of multiple antennas. However, multiple antennae require additional 'real estate' on the device and add to the cost of the device due to both the antennae and the supporting circuitry.

There is a need, therefore, for a method and system that overcomes at least the shortcomings described above.

In accordance with a representative embodiment, a wireless system includes a cluster of wireless stations (STAs) and at least one cluster lead adapted to receive data from the STAs and to provide the data to other cluster leads, or to an access point (AP), or both.

In accordance with another representative embodiment, a method of wireless communication includes forming a cluster of STAs from among STAs of a wireless network and designating at least one of the STAs of the cluster to be a cluster lead. The method also includes exchanging data between the STAs and the cluster lead and re-transmitting the data from the cluster lead to an access point (AP) of the network.

In accordance with yet another representative embodiment, a method of wireless communication includes transmitting an instruction to a wireless station (STA) of a wireless network to form a cluster and to function as a cluster lead. The method also includes forming the cluster of STAs by transmitting an invitation from the cluster lead to other STAs of the wireless network to join the cluster; and transmitting respective sets of sub-carriers.

The invention is best understood from the following detailed description when read with the accompanying drawing figures. It is emphasized that the various features are not necessarily drawn to scale. In fact, the dimensions may be arbitrarily increased or decreased for clarity of discussion. Wherever practical, like reference numerals refer to like elements in the drawing figures.

Figure 1:
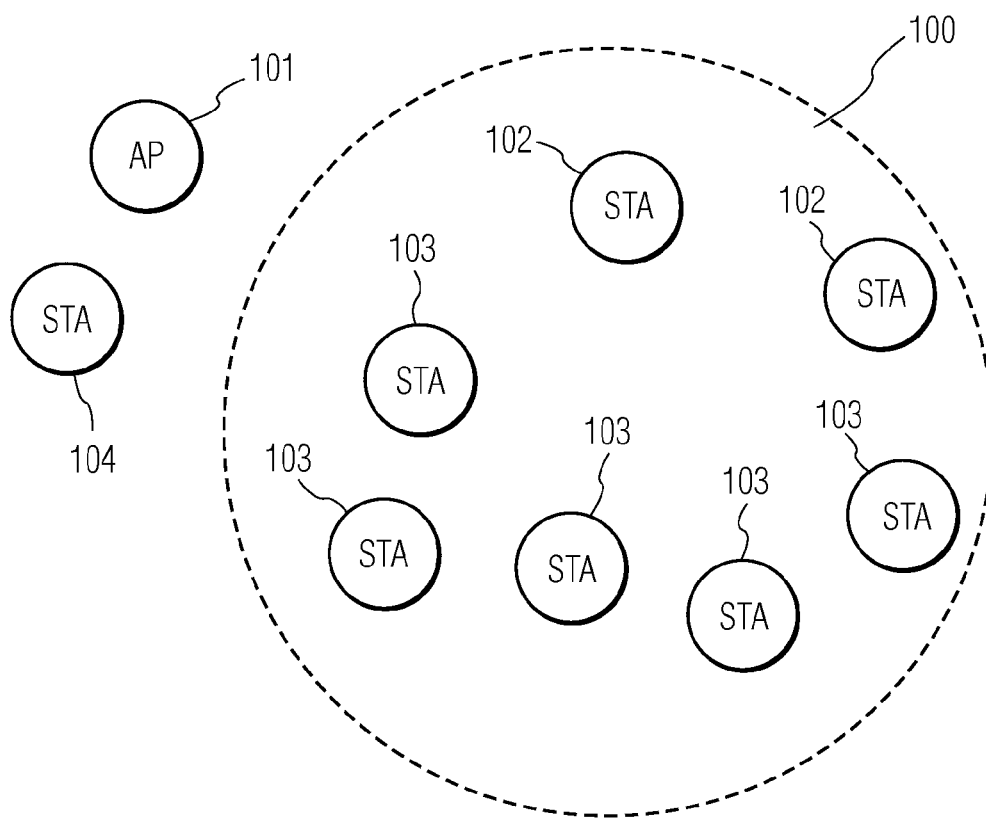
FIG. 1 is a simplified schematic diagram of a wireless communication system in accordance with a representative embodiment.

As used herein, the terms 'a' and 'an' mean one or more; and the term 'plurality' means two or more.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments that depart from the specific details disclosed herein. Moreover, descriptions of well-known devices, methods, systems and protocols may be omitted so as to not obscure the description of the representative embodiments. Nonetheless, such devices, methods, systems and protocols that are within the purview of one of ordinary skill in the art may be used in accordance with the representative embodiments. Finally, wherever practical, like reference numerals refer to like features.

It is noted that in the illustrative embodiments described herein, the network may be a wireless network with a centralized architecture or a decentralized architecture. Illustratively, the network may be one which functions under IEEE 802.11b medium access (MAC) control layer, commonly referred to as WiFi. Alternatively, the network(s) function under a DSA MAC layer, such as to be defined under IEEE 802.22, or as defined under the ECMA 368 standard, IEEE 802.16, IEEE 802.11, or IEEE 802.15.

Moreover, the network may be a cellular network; a wireless local area network (WLAN); a wireless personal area network (WPAN); a wireless body area network or a wireless regional area network (WRAN). Furthermore, the MAC protocol may be a time division multiple access (TDMA) protocol; a carrier sense multiple access (CSMA) protocol; a CSMA with collision avoidance (CSMA/CA) protocol; a Code Division Multiple Access (CDMA) protocol; or a frequency division multiple access (FDMA) protocol; or orthogonal FDMA (OFDMA). It is emphasized that the noted networks and protocols are merely illustrative and that networks and protocols other than those specifically mentioned may be used without departing from the present teachings.

FIG. 1 is a simplified schematic view of a cluster 100 of wireless stations (STAs) (also referred to as nodes or Customer Premise Equipment (CPE)) of a wireless network in accordance with an illustrative embodiment. The cluster 100 may be a part of a centralized network. The network includes an access point (AP) 101, which is also referred to as a base station (BS). Among the STAs are cluster leads 103 (also referred to as moderators) solidary STAs 102, and optionally, solitary STAs 104. To this end, in representative embodiments, certain STAs that join the network are not part of the cluster of STAs. Solitary STAs are not cooperative or stand alone STAs. For example, STA 104, which has joined the network governed by the AP 101, is capable of achieving a required communication rate and QoS without the assistance of the STAs 102,103. Thus, STAs 104 may be referred to as solitary STAs. By contrast, STAs, which are part of the cluster 100 (e.g., STAs 102,103) may be referred to as solidary.

Notably, the present teachings may be generalized to distributed wireless networks. As will be readily appreciated by one of ordinary skill in the art, in a distributed system, the AP 101 is not provided. Rather, another STA(s) controls access to the medium, and fulfills the functionality of the AP 101. While the description that follows relates primarily to a centralized network with AP 101, applications to distributed networks are contemplated by the present teachings.

Illustratively, the STAs 102, 103, 104 may be computers, mobile telephones, personal digital assistants (PDA), wireless sensors, or similar device that typically operates in such networks. In a specific embodiment, at least one of the STAs is stationary. It is contemplated that the STAs are adapted to function in restricted frequency channels of a frequency band that requires protection of incumbent users or in frequency channels of an unlicensed frequency band.

Each STA 102-104 in the network has a single antenna element and the AP 101 can have single or multiple receive antennas. In representative embodiments, the total bandwidth 'W' is split into two non-overlapping disjoint parts 'W1' and 'W2' and are allocated to the solidary and solitary STAs, respectively. The size of 'W1' and 'W2' depends on number of STAs in each group, available power, and rate and QoS requirements. As will be appreciated, the allocation of the bandwidth can be carried out by the AP 101 during quiet periods (QPs) or other house-keeping periods with a Superframe. In the description that follows, allocation of bandwidth (via channels or sub-carriers) refers to allocation of bandwidth W1 to the solidary STAs. The exchange of information and transmission to the AP 101 by solidary STAs 102,103 will not create interference in non-cooperative solitary nodes (e.g., STA 104) that are directly transmitting to the AP 101.

As described more fully herein, orthogonal frequency division multiplexing (OFDM) transmission is usefully implemented. As is known, OFDM is particularly robust against frequency selective fading. Illustratively, STAs 102,103 implement orthogonal frequency division multiple access (OFDMA) as a desired transmission technique. As such, in an embodiment, each STA 102,103 has a fixed set of equally spaced and an equal number of sub-carriers. If there are 'M' nodes in the group and 'N' number of sub-carriers (assume N is an integer multiple of M), any $m^{th}\{m=1 \ldots M\}$ node will receive the set $(S_m\{m, M+m, 2M+m, \ldots N-M+m\} \in S)$. Notably, in other embodiments, the sub-carriers are assigned to each STA based on specific requirements.

Figure 2:
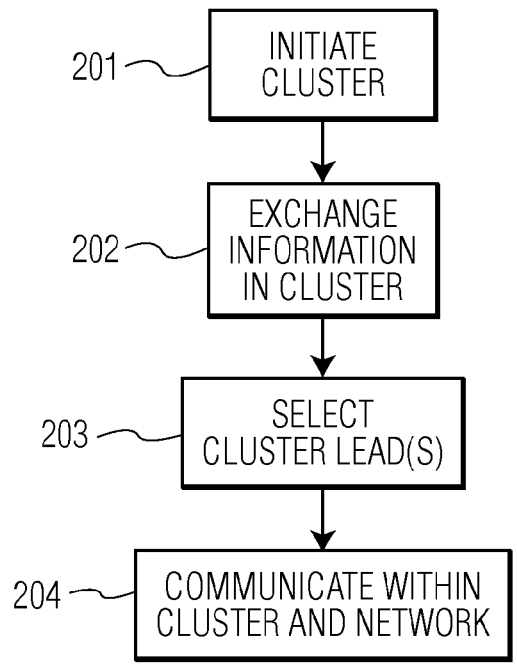
FIG. 2 is a flow-chart of a method of wireless communication in accordance with a representative embodiment.

FIG. 2 is a flow-chart of a method of wireless communication in accordance with a representative embodiment. The method is best understood when reviewed in conjunction with the network described in connection with FIG. 1. Notably, certain features described in connection with FIG. 1 are common to the method described presently. Many of these details are not repeated so as to avoid obscuring the description of the present embodiment.

At step 201, a cluster is initiated. The initiation comprises transmitting one or more invitation signals by one or more of the STAs 102,103 to join a cluster. This initiation step occurs during a data exchange period of a Superframe. Illustratively, the STAs 102, 103 that transmit the invitation may be referred to as 'initiators.' Initiators transmit invitation signals on respective assigned sets of sub-carriers so that the other STAs (non-initiator STAs) can identify the initiator(s).

Beneficially, the invitation signal includes predefined criteria to join the cluster 100. These criteria may include, but are not limited to: a minimum data rate requirement; a minimum quality of service (QoS); and a certain threshold SNR($\gamma_{th}$). For example, if the receiving STA has an SNR greater than the threshold SNR, the STA accepts to join that cluster; and, if not the STA declines. An STA can receive multiple invitations; however can join only one cluster for the full duration of the signaling period. Notably, the STAs can switch to a different cluster at the end of one signaling period.

To form a cluster, an initiator must have acceptance from at least one more STA 102,103, otherwise its invitation call is dropped and the initiator itself may join another cluster or remain a solitary STA. In a representative embodiment, the number of participating STAs 102,103 in a cluster is $X_k$ where the subscript $k\{k=1 \ldots K\}$ denotes cluster index. Therefore $X_1+X_2+\ldots+X_K=M$ and, $X_k \leq X$, maximum allowable nodes in any cluster. Similarly, the maximum number of cluster leads 103 in a cluster cannot exceed half of the total number of STAs 102, 103 in a cluster. In certain embodiment, the number of cluster leads 103 is limited to between two and four.

At step 202, with the cluster(s) formed, information (data) is exchanged between each STA 102, 103 of the cluster 100. This data exchange includes data rate and minimum QoS requirements, cluster information and pilot symbols for channel measurement to the AP 101. Illustratively, the overhead requirement for cluster information is $\log_2 M$ bits for each STA 102, 103 since the STAs need to mention only the subcarrier set index of its initiator (there are 'M' sub-carrier set indices and it requires $\log_2 M$ bits to represent these indices). The AP 101 evaluates the received signals and measures the signal strength of each node.

In a broadcast signal (e.g., in a beacon period), the AP 101 reassigns sub-carriers as needed, among STAs 102, 103 in the cluster. Each STA 102, 103 retains respective sub-carrier sets and STAs 102, 103 with higher rate requirements are given additional sub-carriers from other sets. For example, of the bandwidth W1, the re-assignment may be a selective assignment of sub-carriers from an STA 102, 103 that have a bandwidth surplus to those with a bandwidth deficiency. In a representative embodiment, cluster leads 103 do not transmit in a first signaling period. The AP 101 can therefore redistribute the idle sub-carriers of the cluster leads 103 to STAs 102 that require additional bandwidth.

At step 203, and depending on the strength of the received signals, the AP 101 selects one or more cluster leads 103 for every cluster 100. The number of cluster leads 103 in the cluster 100 depends, inter alia, on number of STAs 102, 103 in the cluster, required spatial diversity (QoS) and channel coherence time.

In representative embodiments, the cluster leads 103 are the only STAs in a cluster that transmit to the AP 101 and a suitable space-time block code is selected according to the number of cluster leads 103 and rate/QoS requirements. Each node has a maximum transmission power of P Watts; hence the total system power is limited to MP Watts at any instant of the signaling period.

Beneficially, transmitting very high rate data within the cluster (i.e., from STAs 102 to cluster leads 103 and from cluster lead 103 to cluster lead 103) takes opportunistic advantage of good channel conditions within the cluster 100. For instance, the cluster leads 103 are more likely to provide line-of-sight communications with certain STAs 102, and with the AP 101 than would be available if STAs of the network were not clustered according to the present teachings. Moreover, the use of space-time block codes to transmit data to the AP 101 can provide spatial diversity to mitigate the channel adversity between the cluster 100 and the AP 101.

At step 204, communication within the cluster 100 and from the cluster 100 to the AP 101 begins. In representative embodiments, the STAs 102, 103 are half-duplex devices and thus are not adapted for transmitting and receiving at the same time. When one STA 102 transmits, other STAs 102, 103 in the cluster 100 can only receive, and therefore, a pure time domain multiplexing (TDM) approach would require at least $X_k$, non-overlapping signaling periods to exchange information within a cluster 100.

In a representative embodiment, the cluster leads 103 remain quiet; while the rest of the STAs 102 transmit their own signal to the cluster leads 103. Beneficially, and as alluded to previously, the channel links among the STAs 102, 103 within the cluster 100 are more robust than the channel links between the cluster 100 and the AP 101.

The following examples are provided to illustrate the inter-cluster robustness of representative embodiments: a group of households located in a rural setting operating under a WiMAX MAC layer each with an outdoor antenna and far away from the AP 101; or a group of WiFi users in a large office building with far away access point; or a battle field where different groups of soldiers trying to communicate to the central command; or a hospital where wireless sensors in different parts of the human body transmitting information to the monitoring device. It is emphasized that these examples are merely intended to illustrate the use of the embodiments and that other exemplary situations are contemplated.

In the above examples, the channel links among STAs 102, 103 in the cluster 100 are likely to have strong line-of-sight, insignificant path loss and shadowing, and reduced delay spread. The STAs 102,103 can take advantage of the channel quality and can transmit at very high data rate.

In a representative embodiment, to further improve inter-cluster robustness, forward error correction (FEC) code, for example, Reed-Solomon or Convolution code, may be implemented to protect signals transmitted from the STAs 102 to the cluster leads 103.

Illustratively, the cluster leads 103 decode the received signals and retain them to re-encode until all the cluster leads 103 also share their own information among themselves. In a representative embodiment, the cluster leads 103 combine all information from STAs 102 nodes and transmit jointly to the AP 101. Notably, in this embodiment, the cluster leads 103 implement a time division multiplexing (TDM) scheme among themselves to share information and thus transmit during different non-overlapping signaling periods. As each cluster lead 103 can use all sub-carriers in one OFDM symbol, the leads 103 can transmit at very high data rate (number of bits per OFDM symbol duration) or in a power limited system, they can switch to a lower constellation with strong FEC.

As noted, in one embodiment, TDM is implemented among the cluster leads 103. Alternatively, in another representative embodiment, the MAC layer provides that some of the cluster leads 103 transmit while one or more remain quiet. For example, consider four cluster leads 103. At first, any three cluster leads will transmit their signals using OFDMA to the fourth cluster lead 103. The receiving cluster lead 103 decodes the received signals, re-encodes the received signals and also injects its data into the packet. The packet is transmitted back to the other cluster leads 103. This approach requires only two (2) signaling periods to exchange information among all four cluster leads 103, while a TDM approach requires four (4) signaling periods. At the end of this process, each cluster lead 103 has information from other cluster leads 103, in addition to information from STAs 102 in the cluster.

In yet another embodiment, the transfer of data from one cluster lead to the next is sequential. To wit, suppose there are three cluster leads 103, with one cluster lead advantageously having a best SNR with respect to the AP 101. One cluster lead 103 may transmit to the cluster lead with which it shares the best channel link (SNR). The data from this cluster lead 103 is added to the receiving cluster lead's data. The next cluster lead 103 transmits the first two cluster leads' data to a third cluster lead 103, which then transmits to the AP 101. In a representative embodiment, the cluster lead that transmits to the AP 101 does not necessarily re-encode the received data or inject any of its data into the packet transmitted to the AP 101.

Figure 3:
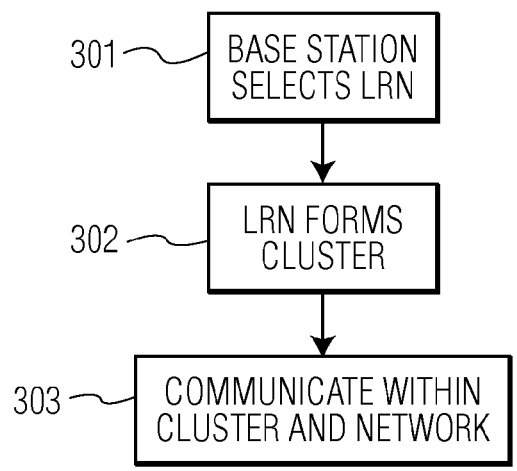
FIG. 3 is a flow chart of a method of wireless communication in accordance with a representative embodiment.

FIG. 3 is a flow-chart of a method of wireless communication in accordance with another representative embodiment. The method is best understood when reviewed in conjunction with the network described in connection with FIG. 1. Moreover, certain features described in connection with FIGS. 1 and 2 are common to the method described presently. Many of these details are not repeated so as to avoid obscuring the description of the present embodiment.

At step 301, the AP 101 selects at least one limited responsibility node (LRN) from among the STAs 102. Notably, all STAs are initially of the group of STAs 102 and are not yet designated as cluster leads. In a representative embodiment, the AP 101 transmits a signal to an STA 102 in a beacon period. The selected STA 102 may be selected randomly in each signaling period or can be based on certain criteria. The signal requests that the STA 102 share limited responsibility (SLR) by taking initiative to form the cluster 100 and also act as a cluster lead 103. At step 302, the selected LRN (now cluster lead 103) transmits invitations to other STAs 102 to join in its network and form the cluster 100.

To reply to the initiator, the receiving STAs 102 transmit their decisions based on threshold SNR, and rate/QoS requirements based on their assigned sets of sub-carriers in a manner such as described previously. The LRN then takes the role of a cluster lead 103 and sends specific instructions to each participating STA 102 on its respective sets of sub-carriers in one OFDM symbol. The STAs 102 are either instructed to transmit their information or stay quiet and work as additional cluster leads 103.

The present embodiment differs from the embodiments described in connection with FIG. 2 as the AP 101 delegates some responsibility to a local node. For example, selecting additional cluster leads 103 may be effected by the LRN. This process would be beneficial, for example, in adhoc networking architectures and emergency situations where groups of nodes can operate somewhat independently to form cooperative clusters.

At step 303, communications within the cluster 100 and between the cluster leads 103 and the AP 101 are carried out in ways similar to those described previously.

As noted previously, a group of cooperative (solidary) STAs 103 may choose to form a cluster 100 when their independent attempts to transmit to the AP 101 do not meet QoS requirements. The members of a cluster 100 are usually the STAs 102, 103 that suffer from large scale shadowing, high path loss exponent, longer distance from the AP 101, or longer delay spread of the channel, or a combination thereof. Beneficially, the methods and systems of the representative embodiments are adapted to achieve spatial diversity (in addition to the presence of frequency or time diversity, if any) by creating an array of geographically dispersed moderators who share their single antenna elements to form a MIMO environment.

The number of cluster leads 103 depends on number of nodes in a cluster, channel adversity and QoS (in terms of spatial diversity) requirements. In previous sections we have discussed a strategy to exchange information within the cluster. A suitable space-time block code is selected according to the number of cluster leads 103 and rate-diversity trade-off requirements. Several examples of space-time block codes for 2, 3 and 4 transmit antennas are known. The cluster leads 103 split the received high data-rate symbols into multiple low data-rate symbols, for example, if cluster leads 103 receive 16 QAM symbols from other nodes in the cluster, each 16 QAM symbol can be split into two QPSK symbols or four BPSK symbols depending on the structure of the STBC. The overall spatial diversity also depends on the number of receive antennas at the AP 101.

The implementation of STBC requires the channel to remain static over the duration of the code block. If a 4×4 STBC is selected when there are four cluster leads 103, it means that the channel between the cluster leads 103 and the AP 101 has to remain fixed over four OFDM symbol durations. In a fast varying channel condition this assumption may not hold, and the STBC has to be spread over four consecutive sub-carriers in one OFDM symbol instead of spreading over four consecutive OFDM symbols. We will still need four OFDM symbols from each cluster lead (moderator) to achieve the target rate. This provides an additional degree of freedom to use STBC in both slow and fast varying channel.

For illustration, consider a system with 64 sub-carriers and 8 nodes: 4 cluster leads $\{m_1, m_2, m_3, m_4\}$ and 4 STAs 102 $\{n_1, n_2, n_3, n_4\}$. All STAs 102 have equal rate requirements R, the duration of one OFDM symbol is T, and the power consumed by each node is P. For simplicity and a fair comparison in terms of power, bandwidth usage, signaling periods, we assume that the nodes in a cluster exchange information among them using a TDM approach that requires 8T signaling periods and consumes power 8P. Then the four cluster leads 103 select a STBC of size four by four (4×4) to transmit to the AP 101 in 8 (two blocks of STBC, each STBC consumes 4 symbol periods) consecutive symbol periods consuming power 32P (each cluster lead transmits symbols of all nodes, hence requires 8P power and there are 4 cluster leads 103). Therefore, the total time required is 16T(8T+8T) and total consumed power is 40P(32P+8P).

In the representative embodiments described herein, wireless networks having cooperative clusters of STAs and methods of communication therebetween are described. As will be appreciated by one of ordinary skill in the art, many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

The invention claimed is:

1. A wireless system, comprising:
a network;
a cluster of wireless stations (STAs) configured within the network;
an access point (AP) configured to govern the network; and
at least one cluster lead configured to send and receive data from the STAs and the AP and to retransmit the received data to other cluster leads, or to the AP, or both, the AP being further configured to designate at least one STA from the cluster as a cluster lead in which designation of the cluster lead by the AP is based at least partially on channel coherence time.

2. The wireless system as claimed in claim 1, wherein the cluster is formed by inviting one or more STAs of a network to join the cluster based on a predefined criterion.

3. The wireless system as claimed in claim 1, wherein the AP is configured to assign sub-carriers to each STA of the cluster.

4. The wireless system as claimed in claim 1, further comprising a solitary STA operating within a wireless network of the system without joining the cluster.

5. The wireless system as claimed in claim 1, wherein the at least one cluster lead transmits the data using a space-time block code.

6. The wireless system as claimed in claim 1, further comprising a plurality of cluster leads, wherein each STA transmits the data and the cluster leads exchange the data among the plurality of cluster leads.

7. The wireless system as claimed in claim 6, wherein the cluster leads transmit the data to the AP.

8. The wireless system as claimed in claim 1, further comprising a plurality of cluster leads, wherein all but one cluster lead transmits the data to one cluster lead.

9. The wireless system as claimed in claim 1, wherein each of the STAs of the cluster comprises a single antenna.

10. A method of wireless communication, the method comprising:

forming a cluster of wireless stations (STAs) from among STAs of a wireless network;
designating, by an access point (AP), at least one of the STAs of the cluster to be a cluster lead such that designation of the cluster lead is based at least partially on channel coherence time, the AP being configured to govern the wireless network;
exchanging data between the STAs and the cluster lead; and
re-transmitting the data from the cluster lead to the AP of the network.

11. The method as claimed in claim 10, wherein the forming further comprises transmitting an invitation signal to STAs of the network to join the cluster, wherein the invitation signal includes a predefined criterion to join the cluster.

12. The method as claimed in claim 10, wherein the designating further comprises:
transmitting data from each of the STAs of the cluster to the AP; and
selecting the at least one cluster lead based on the data.

13. The method as claimed in claim 12, wherein the data comprises a minimum data rate requirement and a minimum quality of service (QoS), and wherein the minimum data rate and the minimum quality of service (QoS) are based on a predefined criterion to join the cluster, and the method further comprises, re-assigning sub-carriers to nodes as needed based on the data.

14. The method as claimed in claim 10, wherein the cluster further comprises a plurality of cluster leads.

15. The method as claimed in claim 14, wherein the exchanging data further comprises:
receiving at least a portion of the data at each of the cluster leads; and
re-transmitting the portion of the data received to other cluster leads until all cluster leads have the data.

16. The method as claimed in claim 14, wherein the exchanging data further comprises:
transmitting a portion of the data from one cluster lead to another cluster lead;
adding another portion of the data to the portion and re-transmitting the portion and the another portion; and
continuing the adding and the re-transmitting until a last cluster lead of the plurality of cluster leads receives the data.

17. A method of wireless communication, the method comprising:
transmitting, by an access point (AP), an instruction to a wireless station (STA) of a wireless network to form a cluster of STAs and to function as a cluster lead, the AP being configured to govern the wireless network, designation of the cluster lead being based at least partially on channel coherence time;
forming the cluster of STAs by transmitting an invitation from the cluster lead to other STAs of the wireless network to join the cluster; and
assigning respective sets of sub-carriers by the cluster lead to each of the STAs of the cluster.

18. The method as claimed in claim 17, further comprising, after the transmitting:
exchanging data between the STAs and the cluster lead; and
re-transmitting the data from the cluster lead to the AP of the network outside of the cluster.

* * * * *